(12) United States Patent
Novis et al.

(10) Patent No.: US 7,846,549 B2
(45) Date of Patent: Dec. 7, 2010

(54) TRANSPARENT SUBSTRATE COATED WITH A SILVER LAYER

(75) Inventors: Yvan Novis, Grand-Leez (BE); Jean-Michel Depauw, Brussels (BE); Daniel Decroupet, Fosses-la Ville (BE)

(73) Assignee: AGC Glass Europe, Brussels (BE)

( * ) Notice: Subject to any disclaimer, the term of this patent is extended or adjusted under 35 U.S.C. 154(b) by 0 days.

(21) Appl. No.: 11/866,632

(22) Filed: Oct. 3, 2007

(65) Prior Publication Data

US 2008/0085404 A1 Apr. 10, 2008

Related U.S. Application Data

(63) Continuation of application No. 11/287,741, filed on Nov. 28, 2005, now abandoned, which is a continuation of application No. 09/719,141, filed as application No. PCT/BE99/00071 on Jun. 4, 1999, now abandoned.

(30) Foreign Application Priority Data

Jun. 8, 1998 (EP) .................. 98110439

(51) Int. Cl. *B32B 17/06* (2006.01)

(52) U.S. Cl. .............. 428/432; 428/426; 428/469; 428/472; 428/689; 428/698; 428/699; 428/701; 428/702; 428/704; 148/518

(58) Field of Classification Search .............. 428/426, 428/432, 469, 472, 689, 698, 699, 701, 702, 428/704; 148/518
See application file for complete search history.

(56) References Cited

U.S. PATENT DOCUMENTS

| 3,034,924 | A | 5/1962 | Kraus et al. |
|---|---|---|---|
| 3,682,528 | A | 8/1972 | Apfel et al. |
| 4,610,771 | A | 9/1986 | Gillery |
| 4,799,745 | A | 1/1989 | Meyer et al. |
| 5,071,206 | A | 12/1991 | Hood et al. |
| 5,110,662 | A | 5/1992 | Depauw et al. |
| 5,168,003 | A | 12/1992 | Proscia |
| 5,279,722 | A | 1/1994 | Szczyrbowski et al. |
| 5,376,455 | A | 12/1994 | Hartig et al. |
| 5,505,989 | A | 4/1996 | Jenkinson |
| 5,584,902 | A | 12/1996 | Hartig et al. |
| 5,595,825 | A | 1/1997 | Guiselin |
| 5,935,702 | A | 8/1999 | Macquart et al. |
| 5,952,084 | A | 9/1999 | Anderson et al. |
| 5,962,115 | A | 10/1999 | Zmelty et al. |
| 5,965,246 | A | 10/1999 | Guiselin et al. |
| 6,398,925 | B1 | 6/2002 | Arbab et al. |
| 2005/0208281 | A1 | 9/2005 | Decroupet et al. |

FOREIGN PATENT DOCUMENTS

| EP | 0 275 474 | 7/1988 |
|---|---|---|
| EP | 0 303 109 | 2/1989 |
| EP | 0 336 257 | 10/1989 |
| EP | 0 657 562 | 6/1996 |
| EP | 0 718 250 | 6/1996 |
| EP | 0 745 569 | 12/1996 |
| EP | 0 761 618 | 3/1997 |
| FR | 2 430 986 | 7/1979 |
| FR | 2 641 271 | 12/1989 |

OTHER PUBLICATIONS

U.S. Appl. No. 12/532,318, filed Sep. 21, 2009, Depauw, et al.

*Primary Examiner*—Andrew T Piziali
(74) *Attorney, Agent, or Firm*—Oblon, Spivak, McClelland, Maier & Neustadt, L.L.P.

(57) ABSTRACT

Low emissivity glazing which is an assembly of thin layers including at least one metal layer reflecting infrared rays between one or more dielectric layers located between the metal layer and the glass sheet and on the metal layer, the light transmission of one clear float glass sheet 4 mm thick coated with said layers being not less than 83%, the metal layer being selected such that the emissivity is not higher than 0.042.

35 Claims, No Drawings

TRANSPARENT SUBSTRATE COATED WITH A SILVER LAYER

CROSS REFERENCE TO RELATED APPLICATIONS

This application is a continuation of U.S. patent application Ser. No. 11/287,741, filed Nov. 28, 2005, now abandoned, which is a continuation of U.S. patent application Ser. No. 09/719,141 filed Feb. 12, 2001, now abandoned, which is a §371 National Phase of PCT/BE99/00071, filed Jun. 4, 1999, which claims the benefit of European Application No. 98110439.1 filed Jun. 8, 1998, the entirety of each of which is hereby incorporated by reference.

BACKGROUND

This invention relates to a transparent substrate, in particular to a coated transparent sheet capable of withstanding heat treatment of a tempering or bending nature without degradation of the coating and adapted for example to be incorporated in a multiple glazing or a laminated glazing.

Many of the terms used to describe the properties of a coated substrate have precise meanings defined in relevant standards. The terms used in this description include the following, most of which are defined by the "Commission Internationale de l'Eclairage" (CIE).

In the present description, two standard illuminants are used: Illuminant C and Illuminant A, as defined by the CIE. Illuminant C represents average daytime light at a color temperature of 6700K. Illuminant A represents the radiation of a Planck radiator at a temperature of about 2856K. This Illuminant represents light emitted by car headlights and is particularly used in evaluating optical properties of vehicle glazings.

The term "luminous transmission" (LTA) as used herein is as defined by the CIE, that is the luminous flux transmitted through a substrate as a percentage of the incident luminous flux for Illuminant A.

The term "energetic transmission" (ET) as used herein is as defined by the CIE, that is the total energy directly transmitted through the substrate without a change in wavelength. It excludes the energy absorbed by the substrate (EA).

The term "color purity" (P) used herein refers to the excitation purity measured with Illuminant C as defined in the Vocabulaire International de l'Eclairage of the CIE, 1987, page 87 and 89. The purity is defined according to a linear scale in which a defined source of white light has a purity of zero and a pure color has a purity of 100%. For vehicle windows the purity of the substrate is measured from the external face of the window.

The term "dominant wavelength" ($\lambda_d$) used herein designates the wavelength of the peak in a range of wavelengths which are transmitted or reflected by the coated substrate.

The term "non-absorbent material" as used herein designates a material having a refractive index [$n(\lambda)$] which is greater than its extinction coefficient [$k(\lambda)$] over the whole of the visible spectrum (280 to 780 nm).

The term "emissivity" as used herein designates the normal emissivity of a substrate as defined in the Vocabulaire International de l'Eclairage of the CIE.

The term "haze" as used herein designates the percentage of diffused light transmitted by a material measured according to the ASTM D 1003 standard.

The Hunter coordinates L, a, b used herein measure the coloration of a material as perceived by an observer. They are defined and measured according to the ASTM D 2244 standard.

It has become more and more usual to apply a number of coating layers forming a coating stack to glass sheets to modify their transmission and reflection properties. Previous proposals for metal coating layers and dielectric coating layers in numerous different combinations have been made to confer chosen optical and energetic properties on glass.

Automotive glazings, in particular, are taking increasingly complex forms which require the glass of which they are made to withstand a bending heat treatment operation. In the architectural field it is also increasingly desired for glazings to have curved forms or for the sheets of glass from which they are made to have undergone thermal tempering for shock resistance and thus safety. However, the majority of coatings intended to be deposited on sheets of glass, particularly those deposited under vacuum, are not able to resist such heat treatment in a satisfactory manner. In particular, their optical properties are significantly degraded during such processes. Thus, it is necessary to apply the coating layers to the sheets of glass after the sheets of glass have taken their final shape or after they have undergone heat treatment which necessitates, particularly for curved glass, particularly complex deposition equipment. Such equipment must enable the deposition of uniform coatings on non-planar substrates.

It has been suggested to overcome this disadvantage by using coating stacks which incorporate coating layers comprised of materials which, when the substrate is raised to the temperature necessary for a tempering or bending heat treatment, can prevent the degradation of the optical properties of the coating stack for the duration of the heat treatment.

This degradation may in particular be attributed to, on the one hand, diffusion of oxygen from the atmosphere or from the dielectric coating layers of the coating stack which leads to oxidation of the metallic layers of the coating stack, and on the other hand to diffusion of sodium from the glass substrate into the coating layers of the coating stack.

European Patent Application No. 761618 describes a method of sputter depositing coatings on a glass substrate according to which the functional metal coating or coatings are surrounded by protecting layers comprising materials adapted to fix the oxygen by oxidation, in particular niobium. According to this document, the absence of degradation of the metallic layers is also due to deposition of the silver layer in a reactive atmosphere comprising at least 10% oxygen.

European Patent Application No. 336257 describes a glass substrate coated 25 with a coating stack which can resist heat treatment and which comprises two metallic coating layers deposited alternatively with three zinc stannate based dielectric coating layers. The first metallic layer is surrounded by titanium protecting layers and the second metallic layer is overlaid with a protection layer which is also of titanium. This material protects the metallic coating layers during heat treatment by being oxidized itself by combination with the oxygen atoms diffused in the coating stack.

European Patent Application No. 303109 describes a glass substrate coated s with a coating stack comprising a silver coating layer surrounded by two coating layers of combination of nickel and chromium which are themselves surrounded by two coating layers of a particular metal oxide. This product is intended to undergo bending by heat treatment in an oxidizing atmosphere during which its luminous transmittance increases significantly.

U.S. Pat. No. 5,584,902 describes a method of sputter depositing a coating stack capable of withstanding a bending or tempering type of heat treatment on to a glass substrate and which comprises a silver coating layer surrounded by two coating layers of a combination of nickel and chromium which are themselves surrounded by two coating layers of a silicon nitride.

Coating stacks such as suggested by these documents comprise protecting coating layers for the functional coating layers which before a bending or tempering type of heat treatment consist of non-oxidized metal. These protecting coating layers will be oxidized during heat treatment such that the optical properties of the coated substrate will be significantly modified during this process. In addition, it is necessary that these protecting coating layers are not oxidized to their interface with the functional metal layers so that the functional metallic layers are not subjected to oxidation. This is unfavorable for obtaining a high luminous transmission of the finished product.

SUMMARY

The present invention relates to a transparent substrate carrying a coating stack comprising at least one metallic coating layer comprising silver or a silver alloy, each metallic coating layer being in contact with two non absorbent transparent dielectric coating layers, the coated substrate being adapted to withstand a bending or tempering type of heat treatment, characterized in that prior to such heat treatment, each of the dielectric coating layers comprises a sub-layer based on a partially oxidized combination of two metals.

We have surprisingly discovered that the presence prior to heat treatment of sub-layers based on a partially oxidized combination of two metals in the coating stack in accordance with the invention protects each metallic coating layer of the coating stack and that this enables a product that withstands this treatment particularly well to be obtained. We have also noted that the luminous transmittance of the substrate at the end of the said heat treatment is higher than when metallic protecting coatings layers are used. As the sub-layers based on a combination of two metals according to the invention are not totally oxidized before heat treatment they allow the absorption of the diffused oxygen in the coating stack during this treatment and thus protect the metallic coating layers from oxidation. In addition, by arranging for these sub-layers to be partially oxidized across their entire thickness before heat treatment, the luminous transmission of the product after heat treatment is greater than if the sub-layers were, prior to heat treatment, non-oxidized is sub-layers of the same combination of metals. Furthermore, the structure of protecting sub-layers which are partially oxidized during deposition is more favorable to the optical properties of the finished product than when these sub-layers are only oxidized during a heat treatment following deposition of the coating stack.

Preferably, the sub-layers based on a combination of two metals comprise 20 Ni and Cr. This combination once oxidized during deposition and heat treatment has a greater transparency that that of sub-layers based on combinations of other metals. In addition, use of a combination of Ni and Cr in combination with the different coating layers of the coating stack allows the finished product to display advantageous optical properties.

According to one preferred form of the invention, at least the sub-layer based on a combination of two metals which is the furthest spaced from the substrate is overlaid with a sub-layer comprising a nitride, preferable a nitride of Si, of Al or of a combination of these elements. Such materials act as barriers to oxygen diffusion in the coating stack and thus limit the quantity of oxygen which arrives at the underlying sub-layer based on a combination of two metals. This is advantageous in allowing heat treatment in very oxidizing conditions without necessitating increases in the thickness of the sub-layers based on a combination of two metals. By overlaying the said sub-layer based on a combination of two metals with a sub-layer of a nitride compound, the sub-layer covered in this way is always able to absorb the entire amount of oxygen which reaches it and thus to maintain its protecting effect with respect to the underlying metallic coating layer.

In one preferred form of the invention at least one metallic coating layer is in contact with an underlying sub-layer comprising an oxide of a metal chosen, in particular, from Ti, Ta, Nb, and Sn. These metals have a crystalline structure which favors recrystalisation of the Ag during heat treatment in such a way that substantially no visible haze appears in the finished product. This is advantageous as when a coating stack comprising a metallic coating layer undergoes a tempering or bending type of heat treatment, the crystalline structure of this coating layer undergoes modifications which can appear macroscopically by the appearance of haze in the coating stack visible in the finished product. Such haze is considered inaesthetic.

Advantageously, at least the sub-layer based on a combination of two metals which is closest to the substrate is in contact with an underlying sub-layer of an oxide of Ti. This is advantageous as the optical properties of a coating stack destined to withstand a tempering or bending type of heat treatment may be deteriorated by diffusion in the lower coating layers of the coating stack of sodium migrating from the upper layers of the glass substrate. An oxide of Ti has inherent properties to block such migration.

Preferably, the dielectric coating layer in contact with the substrate 25 comprises sub-layers of oxides of metals or combinations of metals. As this coating layer is the furthest spaced from the main source of diffusing oxygen, that is the atmosphere, it is not strictly necessary that it comprises a sub-layer of a nitride adapted to block such oxygen diffusion.

In another preferred form of the invention, each metallic coating layer of the coating stack comprises a combination of Ag and Pt or Pd. The addition of one of these elements to the silver confers upon the coating stack a better resistance to corrosion due to ambient humidity.

The coating layers of the coating stack may be completed by a thin final coating layer which provides the coating stack with improved chemical and/or mechanical durability without significantly altering its optical properties. Oxides, nitrides and oxynitrides of silicon, aluminum or combinations of these elements may provide this effect. Silica ($SiO_2$) is generally preferred.

When the coating stack according to the invention has a single metallic coating layer, the optical thickness of the dielectric coating layer closest to the substrate is preferably between 50 and 90 nm, that of the other dielectric coating layer is preferable between 70 and 110 nm, that of the sub-layers based on a combination of two metals is preferably between 3 and 24 nm and the geometrical thickness of the metallic coating layer is preferably between 8 and 15 urn. These ranges of thicknesses allow a coated substrate to be obtained which, after a tempering or bending type of heat treatment has a haze of less than 0.3%.

Such a coating stack deposited on a 4 mm thick clear sodalime glass substrate preferably confers to the substrate after a tempering or bending type of heat treatment a LT greater than 77%, an emissivity less than 0.08 and preferably less than 0.05, a dominant wavelength in reflection of 450 to 500 nm, more preferably from 470 to 500 nm, and a color purity in reflection of 5 to 15%.

Preferably, the thicknesses of the coating layers and sub-layers of a coating stack according to the invention having a single metallic coating layer are chosen between the preferred thicknesses such that during heat treatment, the variation in LTA of the coated substrate is less than 10%, the variation of the dominant wavelength in reflection does not exceed 3 urn and the variation in the color purity in reflection does not exceed 5%.

Such a product may be used in the manufacture of so called low emissivity multiple glazings for buildings. In this case, it is associated with at least one transparent sheet of vitreous material from which it is separated by a volume of gas and has its boundaries limited by a peripheral spacer. In such a glazing, the coated surface is directed towards the gas filled space. In the case of architectural use of a product in accordance with the invention, the coating stack may only have a single metallic coating layer.

It is remarkable that the emissivity after heat treatment of substrates coated according to the invention is of the same order of magnitude as that of standard low emissivity glazings, that is to say those which have not withstood heat treatment, which is generally less than 0.10 in the case of coating stacks deposited by sputtering for LTA of the order of 80%. Multiple glazings incorporating a sheet of glass coated according to the invention and having undergone a tempering or bending type of heat treatment thus offer equivalent optical properties to those of a glazing comprising a sheet of coated glass which has not undergone heat treatment whilst providing, when the coated substrate is tempered, a better mechanical shock resistance and improved safety to the occupants of areas in which these glazings are installed.

When a coating stack in accordance with the invention comprises two 20 metallic coating layers, the optical thickness of the dielectric coating layer closest to the substrate is preferably between 50 and 80 nm, that of the dielectric coating layer spaced furthest from the substrate is preferably between 40 and 70 urn, that of the intermediate dielectric coating layer is preferably between 130 and 170 nm, that of the sub-layers based on a composition of two metals is preferably between 3 and 24 urn and the geometrical thickness of the metallic coating layers is preferably between 8 and 15 urn.

Such a coating stack deposited on a clear 2.1 mm thick sodalime glass substrate confers on the substrate, after a tempering or bending type heat treatment, a haze of less than 0.5%, a LTA of greater than 76%, a dominant wavelength in reflection between 450 and 500 nm, preferably between 470 and 500 nm, and a color purity in reflection between 5 and 15%.

Such a product may be used to form part of a multiple glazing. It may also 5 be advantageously used as part of a laminated glazing, particularly a vehicle windshield. Legal requirements for windshields require a luminous transmission (LTA) of at least 70% in the USA and at least 75% in Europe. With respect to solar energy, the total energy directly transmitted (ET) is preferably less than 50%. A further factor is the color of the coated substrate which must satisfy the requirements of the automotive industry. These requirements generally necessitate that a coating stack according to the invention which is applied to a sheet of glass of a laminated glazing intended to form a vehicle windshield comprises at least two metallic coating layers. When the coated substrate is used in such a structure, it may be useful to employ a thin final coating layer as described above to reduce the risk of delamination of the laminated glazing.

The metallic coating layers of a coating stack in accordance with the invention may be connected to a source of electrical current such that they give off heat by the Joule effect. Such a windshield may thus be de-iced or de-misted.

The invention also relates to a method of manufacture of a product such as described above using a sputtering deposition technique to deposit coating layers of the coating stack.

Preferably, each metallic coating layer is deposited in an oxidizing atmosphere, in particular comprising argon and oxygen. In particularly preferred forms of the invention, the atmosphere in which each metallic coating layer is deposited comprises less than 10% and preferably between 3 and 7% oxygen. These concentrations allow better thermal stability of these coating layers when compared with identical coating layers deposited in an inert atmosphere whilst being of a sufficiently low concentration to avoid any risk of oxidation of the metal during its deposition.

The materials which comprise the dielectric layers, with the exception of the sub-layers based on a composition of two metals, are preferably deposited from cathodes having an alternating current supply. This process has the advantage of producing coating layers with a density and structure which is more effective in resisting diffusion of sodium and oxygen in the coating stack during a tempering or bending type heat treatment than when cathodes having a direct current supply are used to deposit the same coating layers. Nevertheless, the advantage in terms of density and structure of the coating layers is only obtained by this process for thicknesses of coating layers which are greater than those of the sub-layers based on a composition of two metals. For this reason, these sub-layers based on a composition of two metals are not deposited by this method.

The invention will now be described in greater detail with reference to the following non-limitative examples.

DETAILED DESCRIPTION

Examples

Two types of clear sodalime sheet glass substrate samples of 2.1 mm and 4 mm thick are passed through in-line deposition equipment comprising five vacuum enclosures (at a pressure of 0.3 Pa), a substrate conveyor, power sources and gas admission valves. Each depositing enclosure contains magnetron assisted sputtering cathodes, gas entries and evacuation outlets, the deposition being obtaining by moving the substrate a number of times under the cathode.

The first enclosure contains two cathodes provided with targets formed from titanium. These cathodes are supplied from an alternating current source to which they are connected such that each works alternatively according to the frequency of the current to deposit a first coating layer of an oxide of Ti in an atmosphere of oxygen and argon. The second enclosure contains a cathode which is a combination of Ni and Cr supplied by a direct current source to deposit a non-absorbent partially oxidized sub-layer of a combination of Ni and Cr in an atmosphere of oxygen and argon. The third enclosure is the same as the first enclosure to deposit a third sub-layer of an oxide of Ti. The fourth enclosure is subdivided into two compartments. The first of these contains a cathode of Ag supplied from a direct current source to deposit a coating layer of metallic Ag in an atmosphere of argon and oxygen, and the second contains a cathode of a combination of Ni and Cr supplied by a direct current source to deposit a non-absorbent partially oxidized sub-layer of a combination of Ni and Cr in an atmosphere of oxygen and argon which is more oxidizing that the first enclosure. The fifth enclosure contains two silicon cathodes supplied from an alternating current source to deposit a non-absorbent sub-layer of silicon nitride in a nitrogen atmosphere. This sequence of enclosures is repeated for the deposition of a coating stack comprising two metallic coating layers.

Table A sets out the optical and energetic properties of coated substrates intended for use as part of a multiple glazing both before heat treatment (the numbers without apostrophes) and after heat treatment. The thicknesses given are in nm.

The coated substrate subsequently undergoes a tempering heat treatment with a 3 mm pre-heating at 570° C. followed by a 3 min tempering heating at 700° C.

Table B sets out the optical and energetic properties before (A) and after (A') heat treatment of a coated substrate intended for use in a multiple glazing having a coated stack which is not in accordance with the present invention. This coating stack comprises protecting layers for the metallic coating layer which comprise a non-oxidized combination of Ni and Cr. This comparative example shows that such a coating stack has both an emissivity and a haze which is greater than the products according to the invention.

Table C sets out the optical and energetic properties of coated substrates before heat treatment (the numbers with apostrophes) and after heat treatment which are intended for use as part of a laminated glazing. The thicknesses given are in nm.

In this case, the following sequence is deposited on a 2.1 mm thick clear sodalime glass substrate:

a non-absorbent sub-layer of an oxide of titanium, a protecting, non-absorbent sub-layer of a partially oxidized combination of nickel and chrome in a weight ratio of 80/20, a non-absorbent sub-layer of an oxide of titanium, a coating layer of silver, a protecting, non-absorbent sub-layer of a partially oxidized combination of nickel and chrome in a weight ration of 80/20, a sub-layer of silicon nitride, a sub-layer of an oxide of titanium, a protecting, non-absorbent sub-layer of a partially oxidized combination of nickel and chrome in a weight ratio of 80/20, a coating layer of silver, a protecting, non-absorbent sub-layer of a partially oxidized combination of nickel and chrome in a weight ration of 80/20, a sub-layer of silicon nitride.

The coated substrate subsequently undergoes a bending heat treatment at a temperature of 635° C. during 12 min.

It is then incorporated into a laminated sheet comprising, in order, the said coated substrate, an adhesive sheet of polyvinalbutyral (PVB) having a thickness of 0.76 mm and second sheet of clear 2.1 mm thick sodalime glass. Example 17" sets out the optical properties of a laminated glazing comprising a coated substrate in accordance with example 17.

When the coating stacks according to the examples of Table C are intended to be used in multiple glazings for buildings, they are deposited on sodalime glass substrates of 4 or 6 mm thick. The optical properties set out in the said table are the same with the exception of LTA which is reduced by about 0.5% by mm of increased thickness of the substrate.

TABLE A

|  | Ex. | | | | | |
| --- | --- | --- | --- | --- | --- | --- |
|  | 1 | 1' | 2 | 2' | 3 | 3' |
| $TiO_2$ (nm) | 19.0 | 19.0 | 21.5 | 21.5 | 15.5 | 15.5 |
| NiCrOx (nm) | 10.0 | 10.0 | 6.0 | 6.0 | 6.0 | 6.0 |
| $TiO_2$ (nm) | 0.0 | 0.0 | 0.0 | 0.0 | 6.0 | 6.0 |
| Ag (nm) | 13.5 | 13.5 | 14.0 | 14.0 | 14.0 | 14.0 |
| NiCrOx (nm) | 3.3 | 3.3 | 3.3 | 3.3 | 3.3 | 3.3 |
| $Si_3N_4$ (nm) | 50.0 | 50.0 | 50.0 | 50.0 | 50.0 | 50.0 |
| LTA4 (%) | 76.5 | 81.4 | 74.7 | 80.2 | 74.1 | 78.1 |
| $\epsilon$ | 0.050 | 0.050 | 0.050 | 0.040 | 0.050 | 0.030 |
| $\lambda_D$ (nm) | 475.2 | 474.2 | 478.7 | 476.4 | 478.1 | 477.6 |
| P (%) | 22.1 | 20.2 | 17.7 | 16.3 | 18.1 | 14.1 |
| haze (%) | 0.20 | 0.20 | 0.16 | 0.19 | 0.16 | 0.18 |

|  | Ex. | | | | | |
| --- | --- | --- | --- | --- | --- | --- |
|  | 4 | 4' | 5 | 5' | 6 | 6' |
| $TiO_2$ (nm) | 17.5 | 17.5 | 17.5 | 17.5 | 11.5 | 11.5 |
| NiCrOx (nm) | 7.5 | 7.5 | 7.5 | 7.5 | 6.0 | 6.0 |
| $TiO_2$ (nm) | 6.0 | 6.0 | 6.0 | 6.0 | 6.0 | 6.0 |
| Ag (nm) | 10.5 | 10.5 | 10.5 | 10.5 | 23.0 | 23.0 |
| NiCrOx (nm) | 6.0 | 6.0 | 12.0 | 12.0 | 6.0 | 6.0 |
| $Si_3N_4$ (nm) | 21.0 | 21.0 | 15.0 | 15.0 | 6.0 | 6.0 |
| LTA4 (%) | 79.0 | 81.9 | 78.0 | 78.5 | 80.0 | 82.0 |
| $\epsilon$ | 0.080 | 0.058 | 0.075 | 0.062 | 0.092 | 0.074 |
| $\lambda_D$ (nm) | 477.5 | 471.9 | 479.6 | 478.1 | 497.9 | 482.5 |
| P (%) | 15.4 | 10.5 | 15.6 | 9.3 | 6.2 | 34.1 |
| haze (%) | 0.10 | 0.18 | 0.10 | 0.17 | 0.16 | 0.29 |

|  | Ex. | | | | | |
| --- | --- | --- | --- | --- | --- | --- |
|  | 7 | 7' | 8 | 8' | 9 | 9' |
| $TiO_2$ (nm) | 23.0 | 23.0 | 23.0 | 23.0 | 13.0 | 13.0 |
| NiCrOx (nm) | 6.0 | 6.0 | 6.0 | 6.0 | 6.0 | 6.0 |
| $TiO_2$ (nm) | 6.0 | 6.0 | 6.0 | 6.0 | 6.0 | 6.0 |
| Ag (nm) | 10.5 | 10.5 | 10.5 | 10.5 | 10.5 | 10.5 |
| NiCrOx (nm) | 6.0 | 6.0 | 6.0 | 6.0 | 6.0 | 6.0 |
| $Si_3N_4$ (nm) | 50.0 | 50.0 | 21.0 | 21.0 | 21.0 | 21.0 |
| LTA4 (%) | 84.0 | 87.4 | 76.0 | 77.1 | 80.0 | 83.1 |
| $\epsilon$ | 0.090 | 0.073 | 0.099 | 0.076 | 0.095 | 0.066 |
| $\lambda_D$ (nm) | ** | 453.4 | 481.4 | 482.1 | 478.6 | 473.7 |
| P (%) | ** | 7.7 | 12.0 | 6.8 | 16.0 | 12.3 |
| haze (%) | 0.12 | 0.27 | 0.14 | 0.25 | 0.08 | 0.20 |

TABLE B

| Ex. | SnO2 (nm) | NiCr (nm) | Ag (nm) | NiCr (nm) | SnO2 (nm) | LTA4 (%) | $\epsilon$ | $\lambda_D$ (nm) | P (%) | haze (%) |
| --- | --- | --- | --- | --- | --- | --- | --- | --- | --- | --- |
| A | 38.0 | 1.2 | 10.5 | 1.2 | 46.0 | 68.0 | 0.090 | 474.5 | 14.5 | 0.20 |
| A' | 38.0 | 1.2 | 10.5 | 1.2 | 46.0 | 77.5 | 0.130 | 470.0 | 20.0 | 0.40 |

N.B.: $\lambda_D$ et P are measured in reflection from the coated side

TABLE C

| | Ex. | | | | | | | |
|---|---|---|---|---|---|---|---|---|
| | 10 | 10' | 11 | 11" | 12 | 12' | 13 | 13' |
| TiO$_2$ (nm) | 13.0 | 13.0 | 14.0 | 14.0 | 14.0 | 14.0 | 13.0 | 13.0 |
| NiCrOx (nm) | 7.5 | 7.5 | 6.0 | 6.0 | 6.0 | 6.0 | 6.0 | 6.0 |
| TiO$_2$ (nm) | 6.0 | 6.0 | 6.0 | 6.0 | 6.0 | 6.0 | 6.0 | 6.0 |
| Ag (nm) | 10.5 | 10.5 | 10.5 | 10.5 | 10.5 | 10.5 | 10.5 | 10.5 |
| NiCrOx (nm) | 3.3 | 3.3 | 1.7 | 1.7 | 1.7 | 1.7 | 1.7 | 1.7 |
| Si$_3$N$_4$ (nm) | 44.5 | 44.5 | 46.0 | 46.0 | 47.0 | 47.0 | 51.0 | 51.0 |
| TiO2 (nm) | 19.5 | 19.5 | 19.5 | 19.5 | 19.5 | 19.5 | 19.5 | 19.5 |
| NiCrOx (nm) | 3.0 | 3.0 | 3.0 | 3.0 | 1.7 | 1.7 | 1.7 | 1.7 |
| TiO2 (nm) | 0.0 | 0.0 | 0.0 | 0.0 | 0.0 | 0.0 | 0.0 | 0.0 |
| Ag (nm) | 10.5 | 10.5 | 10.5 | 10.5 | 10.5 | 10.5 | 10.5 | 10.5 |
| NiCrOx (nm) | 6.0 | 6.0 | 5.0 | 5.0 | 5.0 | 5.0 | 6.0 | 6.0 |
| Si3N4 (nm) | 21.0 | 21.0 | 22.0 | 22.0 | 22.0 | 22.0 | 27.0 | 27.0 |
| LTA (%) | 71.0 | 76.4 | 71.0 | 77.2 | 72.0 | 78.5 | 72.0 | 78.1 |
| λ$_D$ (nm) | 498.7 | 484.0 | 516.9 | 487.9 | 497.8 | 485.6 | 475.3 | 540.5 |
| P (%) | 1.83 | 13.2 | 2.3 | 11.1 | 3.4 | 13.0 | 13.4 | 4.0 |
| haze (%) | 0.11 | 0.48 | 0.14 | 0.46 | 0.12 | 0.48 | 0.10 | 0.45 |

| | Ex. | | | | | | | | |
|---|---|---|---|---|---|---|---|---|---|
| | 14 | 14' | 15 | 15' | 16 | 16' | 17 | 17' | 17" |
| TiO$_2$ (nm) | 16.0 | 16.0 | 16.0 | 16.0 | 16.0 | 16.0 | 16.0 | 16.0 | 16.0 |
| NiCrOx (nm) | 6.0 | 6.0 | 6.0 | 6.0 | 6.0 | 6.0 | 6.0 | 6.0 | 6.0 |
| TiO$_2$ (nm) | 6.0 | 6.0 | 6.0 | 6.0 | 6.0 | 6.0 | 6.0 | 6.0 | 6.0 |
| Ag (nm) | 10.5 | 10.5 | 10.5 | 10.5 | 10.5 | 10.5 | 10.5 | 10.5 | 10.5 |
| NiCrOx (nm) | 1.7 | 1.7 | 1.7 | 1.7 | 3.2 | 3.2 | 2.5 | 2.5 | 2.5 |
| Si$_3$N$_4$ (nm) | 51.0 | 51.0 | 51.0 | 51.0 | 51.0 | 51.0 | 51.0 | 51.0 | 51.0 |
| TiO2 (nm) | 19.5 | 19.5 | 19.5 | 19.5 | 19.5 | 19.5 | 19.5 | 19.5 | 19.5 |
| NiCrOx (nm) | 2.5 | 2.5 | 2.5 | 2.5 | 2.5 | 2.5 | 2.5 | 2.5 | 2.5 |
| TiO2 (nm) | 0.0 | 0.0 | 0.0 | 0.0 | 0.0 | 0.0 | 0.0 | 0.0 | 0.0 |
| Ag (nm) | 10.5 | 10.5 | 10.5 | 10.5 | 10.5 | 10.5 | 10.5 | 10.5 | 10.5 |
| NiCrOx (nm) | 6.0 | 6.0 | 6.0 | 6.0 | 6.0 | 6.0 | 6.0 | 6.0 | 6.0 |
| Si3N4 (nm) | 32.0 | 32.0 | 27.0 | 27.0 | 27.0 | 27.0 | 27.0 | 27.0 | 27.0 |
| LTA (%) | 72.0 | 78.3 | 72.0 | 78.2 | 71.0 | 77.2 | 71.0 | 77.5 | 76.9 |
| ET (%) | | | | | | | | | 40.8 |
| λ$_D$ (nm) | ** | 476.8 | 455.7 | 480.0 | ** | 477.9 | ** | 478.3 | 477.6 |
| P (%) | ** | 9.6 | 6.1 | 17.3 | ** | 14.7 | ** | 16.2 | 10.7 |
| haze (%) | 0.09 | 0.48 | 0.12 | 0.47 | 0.08 | 0.47 | 0.10 | 0.46 | 0.46 |

N.B.: λ$_D$ and P are measured in reflection from the glass side
**: purple nuance for which no precise value of λ$_D$ and P can be determined.

The invention claimed is:

1. A coated transparent substrate which carries a coating stack, the coating stack being in direct contact with the transparent substrate and the coating stack including:
   at least one metallic coating layer including silver or a silver alloy;
   two non-absorbent transparent dielectric coating layers in contact with each metallic coating layer,
   wherein each dielectric coating layer in the coating stack includes a sub-layer based on a partially but not totally oxidized combination of at least two metals,
   wherein a dielectric coating layer between the substrate and a metallic coating layer closest to the substrate includes
      a first sub-layer of an oxide of a metal selected from Ti, Ta, Nb and Sn in contact with the metallic coating layer closest to the substrate, and
      a second sub-layer based on a partially but not totally oxidized combination of at least two metals that is in direct contact with the first sub-layer and is not in direct contact with the metallic coating layer closest to the substrate,
   wherein the coated substrate has not been subjected to bending or tempering heat treatment, and
   wherein the coated substrate is adapted to withstand a bending or tempering heat treatment.

2. A transparent substrate carrying a coating stack in accordance with claim 1, wherein the said combination of two metals is based on Ni and Cr.

3. A transparent substrate carrying a coating stack in accordance with claim 1, wherein the dielectric coating layer positioned between the substrate and the first metallic coating layer comprises sub-layers of metal oxides or of oxides of combinations of metals.

4. A transparent substrate carrying a coating stack in accordance with claim 1, wherein at least the sub-layer based on a partially oxidized combination of two metals which is closest to the substrate is in contact with an underlying sub-layer of an oxide of titanium.

5. A transparent substrate carrying a coating stack in accordance with claim 1, wherein at least one of the two non-absorbent transparent dielectric coating layers comprises a sub-layer of at least one nitride.

6. A transparent substrate carrying a coating stack in accordance with claim 5, wherein the at least one nitride is a nitride of Si, Al, or a combination of these elements.

7. A transparent substrate carrying a coating stack in accordance with claim 1, wherein the at least one metallic coating layer is selected from the group consisting of silver, a combination of silver and platinum, a combination of silver and palladium, and a combination of silver, platinum and palladium.

8. A transparent substrate carrying a coating stack in accordance with claim 1, wherein the coating stack contains a single metallic coating layer.

9. A transparent substrate carrying a coating stack in accordance with claim 8, wherein the optical thickness of a dielectric coating layer closest to the substrate is between 50 and 90 nm, that of the other dielectric coating layer is between 63 and 110 nm, that of the sub-layers based on a combination of two metals is between 3 and 24 nm and the geometrical thickness of the metallic coating layer is between 8 and 15 nm.

10. A transparent substrate carrying a coating stack in accordance with claim 1, wherein the substrate is adapted to undergo a tempering or bending type of heat treatment so as to give a haze of less than 0.3%.

11. A transparent substrate carrying a coating stack in accordance with claim 1, wherein the substrate is adapted to undergo a tempering or bending type of heat treatment so as to give an emissivity of less than 0.08 after heat treatment.

12. A transparent substrate carrying a coating stack in accordance with claim 1, wherein the substrate is adapted to undergo a tempering or bending type of heat treatment so that after heat treatment the luminous transmittance of the substrate under Illuminant A varies by less than 10%, its color purity in reflection varies by less than 5% and its dominant wavelength in reflection varies by less than 3 nm with respect to the values of the non heat-treated substrate.

13. A transparent substrate carrying a coating stack in accordance with claim 1, characterized in that the coating stack comprises, in order, the transparent substrate, a first non-absorbent transparent dielectric coating layer, a first metallic coating layer, an intermediate non-absorbent transparent dielectric coating layer, a second metallic coating layer and a third non-absorbent transparent dielectric coating layer.

14. A transparent substrate carrying a coating stack in accordance with claim 13, characterized in that the optical thickness of the dielectric coating layer closest to the substrate is between 50 and 80 nm, that of the dielectric coating layer spaced furthest from the substrate is between 40 and 63 nm, that of the intermediate dielectric coating layer is between 130 and 163 nm, that of the sub-layers based on a composition of two metals is between 3 and 24 nm and the geometrical thickness of the metallic coating layers is between 8 and 15 nm.

15. A transparent substrate carrying a coating stack in accordance with claim 1, wherein the substrate is adapted to undergo a tempering or bending type of heat treatment so as to give a haze of less than 0.5% and a TLA greater than 76% after heat treatment.

16. A multiple glazing comprising a coated substrate in accordance with claim 1.

17. A laminated glazing comprising a coated substrate in accordance with claim 1.

18. A vehicle windshield comprising a coated substrate in accordance with claim 1.

19. Method of manufacturing a transparent substrate carrying a coating stack in accordance with claim 1, characterized in that at least one metallic coating layer is sputter deposited in an oxidizing atmosphere comprising less than 10% oxygen.

20. Method in accordance with claim 19, characterized in that the said atmosphere comprises 3 to 7% oxygen.

21. A coated transparent substrate comprising:
a. a glass substrate;
b. a first non-absorbent transparent dielectric coating layer comprising
    i. a first dielectric sub-layer,
    ii. a second dielectric sub-layer based on a partially but not completely oxidized combination of Ni and Cr, and
    iii. a third dielectric sub-layer of an oxide of a metal selected from Ti, Ta, Nb and Sn,
    wherein the second dielectric sub-layer is in contact with the first and third dielectric sub-layers, and the third dielectric sub-layer is in contact with a metallic coating layer including silver or a silver alloy; and
c. a second non-absorbent transparent dielectric coating layer comprising a sub-layer based on a partially but not totally oxidized combination of Ni and Cr,
wherein the coated transparent substrate has not been subjected to bending or tempering heat treatment, and
wherein the coated transparent substrate is adapted to withstand a bending or tempering heat treatment.

22. A coated transparent substrate consisting essentially of, in order:
d. a glass substrate;
e. a first non-absorbent transparent dielectric coating layer comprising
    iv. a first dielectric sub-layer,
    v. a second dielectric sub-layer based on a partially but not completely oxidized combination of Ni and Cr, and
    vi. a third dielectric sub-layer of an oxide of a metal selected from Ti, Ta, Nb and Sn,
    wherein the second dielectric sub-layer is in contact with the first and third dielectric sub-layers, and the third dielectric sub-layer is in contact with a first metallic coating layer including silver or a silver alloy;
f. a second non-absorbent transparent dielectric coating layer comprising a sub-layer based on a partially but not totally oxidized combination of Ni and Cr;
g. a second metallic coating layer including silver or a silver alloy; and
h. a third non-absorbent transparent dielectric coating layer comprising a sub-layer based on a partially but not totally oxidized combination of Ni and Cr,
wherein the coated transparent substrate has not been subjected to bending or tempering heat treatment, and
wherein the coated transparent substrate is adapted to withstand a bending or tempering heat treatment.

23. A transparent substrate carrying a coating stack in accordance with claim 21, wherein the first dielectric sub-layer comprises an oxide of titanium.

24. A transparent substrate carrying a coating stack in accordance with claim 21, wherein at least one of the first and second non-absorbent transparent dielectric coating layers comprises a sub-layer of at least one nitride.

25. A transparent substrate carrying a coating stack in accordance with claim 24, wherein the at least one nitride is a nitride of Si, Al, or a combination of these elements.

26. A transparent substrate carrying a coating stack in accordance with claim 21, wherein the at least one metallic coating layer is selected from the group consisting of silver, a combination of silver and platinum, a combination of silver and palladium, and a combination of silver, platinum and palladium.

27. A transparent substrate carrying a coating stack in accordance with claim 21, wherein the coating stack contains a single metallic coating layer.

28. A transparent substrate carrying a coating stack in accordance with claim 27, wherein the optical thickness of a non-absorbent transparent dielectric coating layer closest to the substrate is between 50 and 90 nm, that of the other non-absorbent transparent dielectric coating layer is between 63 and 110 nm, that of the second dielectric sub-layer is between 3 and 24 nm and the geometrical thickness of the metallic coating layer is between 8 and 15 nm.

29. A transparent substrate carrying a coating stack in accordance with claim 21, wherein the substrate is adapted to undergo a tempering or bending type of heat treatment so as to give a haze of less than 0.3%.

30. A transparent substrate carrying a coating stack in accordance with claim 21, wherein the substrate is adapted to undergo a tempering or bending type of heat treatment so as to give an emissivity of less than 0.08 after heat treatment.

31. A transparent substrate carrying a coating stack in accordance with claim 21, wherein the substrate is adapted to undergo a tempering or bending type of heat treatment so that after heat treatment the luminous transmittance of the substrate under Illuminant A varies by less than 10%, its color purity in reflection varies by less than 5% and its dominant wavelength in reflection varies by less than 3 nm with respect to the values of the non heat-treated substrate.

32. A transparent substrate carrying a coating stack in accordance with claim 21, wherein the substrate is adapted to undergo a tempering or bending type of heat treatment so as to give a haze of less than 0.5% and a TLA greater than 76% after heat treatment.

33. A multiple glazing comprising a coated substrate in accordance with claim 21.

34. A laminated glazing comprising a coated substrate in accordance with claim 21.

35. A vehicle windshield comprising a coated substrate in accordance with claim 21.

* * * * *